(12) United States Patent
Keller et al.

(10) Patent No.: US 6,705,289 B1
(45) Date of Patent: Mar. 16, 2004

(54) DEVICE AND METHOD FOR DETERMINING THE FIRING ANGLE

(75) Inventors: Torsten Keller, Bobental (DE); Martin Haussmann, Sachsenheim (DE); Jens Neuberg, Stuttgart (DE); Joerg Kerner, Mundelsheim (DE); Volker Gandert, Unterriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/069,897

(22) PCT Filed: Aug. 22, 2000

(86) PCT No.: PCT/DE00/02862

§ 371 (c)(1),
(2), (4) Date: Jun. 28, 2002

(87) PCT Pub. No.: WO01/16481

PCT Pub. Date: Mar. 8, 2001

(30) Foreign Application Priority Data

Aug. 26, 1999 (DE) .......................................... 199 40 511

(51) Int. Cl.[7] .............................................. F02P 5/145
(52) U.S. Cl. .................. 123/406.5; 123/406.59
(58) Field of Search ................ 123/406.5, 406.51, 123/406.59

(56) References Cited

U.S. PATENT DOCUMENTS

| | | | |
|---|---|---|---|
| 4,232,642 A | 11/1980 | Yamaguchi et al. | |
| 4,351,306 A | * 9/1982 | Luckman et al. | 123/406.51 |
| 4,870,935 A | * 10/1989 | Araki | 123/406.51 |
| 4,930,477 A | 6/1990 | Nanyoshi et al. | |
| 5,566,657 A | 10/1996 | Hosoe | |
| 5,692,473 A | * 12/1997 | Thomas et al. | 123/406.51 |
| 6,047,681 A | * 4/2000 | Scherer et al. | 123/406.46 |

FOREIGN PATENT DOCUMENTS

DE 43 34 865 4/1995
DE 196 51 238 6/1998

OTHER PUBLICATIONS

Patent Abstracts of Japan, vol. 1997, No. 2, Feb. 28, 1997; JP 08 261124 A (Daihatsu Motor Co., Ltd), (Oct. 8, 1996), abstract.

* cited by examiner

*Primary Examiner*—Erick Solis
(74) *Attorney, Agent, or Firm*—Kenyon & Kenyon

(57) ABSTRACT

A device and a method are provided to, with the aid of a limiting module, advance the maximally retarded ignition angle by a value with respect to the static combustion limit. The timing advance of the maximally retarded ignition angle may be used to avoid uncontrolled combustions in the exhaust, so-called exhaust backfirings. Such exhaust backfirings may occur in dynamic operating states.

43 Claims, 10 Drawing Sheets

DEVICE AND METHOD FOR DETERMINING THE FIRING ANGLE

FIELD OF THE INVENTION

The present invention relates to a device and a method for determining the ignition angle of an internal combustion engine.

BACKGROUND INFORMATION

In the BOSCH Technical Information, Kombiniertes Zünd-und Benzineinspritzsystem MOTRONIC (Combined Ignition and Gasoline Injection System MOTRONIC) (1987 722 011, KH/VDT-09.85-De), control units for electronic ignition control are described, where between two ignition processes, the control unit ascertains the optimal ignition angle from engine information such as load, speed and temperature with reference to program maps. The ignition angle may thus be adapted individually to various operating states of the engine. The ignition angle may be advanced or retarded by any value as desired as a function of switching signals.

The German Published Patent No. 196 51 238 describes an ignition control system which contains a limiting module that limits the ignition angle, determined in light of engine information, to a maximally retarded value. Limitation of the ignition angle to a maximally retarded value is desirable, since in response to the demand for a torque reduction or a reduction in the thermal efficiency, the ignition angle may be retarded. However, the retarded ignition angle thus obtained may not exceed a maximally retarded value, since otherwise a permissible manifold temperature or a limiting value for emissions may be exceeded. According to the related art, such a maximally retarded value, the so-called static combustion limit (IASTAT(max)), may be determined in terms of the limiting value for the emission of hydrocarbons and the limiting value for the manifold temperature.

During certain operating states of the engine, secondary reactions may occur in the exhaust, so-called backfirings, which are caused by unburned or partially burned fuel getting into the exhaust. The backfirings may lead to noise pollution and destruction of components. The static combustion limit lies at ignition angles which are too retarded for the specific operating states.

SUMMARY OF THE INVENTION

A device and method, respectively, of the present invention may have the advantage that, during specific operating states, by advancing the maximally retarded ignition angle, exhaust backfirings and therefore noise pollution and destruction of components may be effectively avoided.

Advantageous further refinements and improvements of the device and method for determining the ignition angle are possible via exemplary embodiments and/or exemplary methods of the present invention. In particular, an exemplary method may be used for operating states in which an engine dynamic exists, and there is no positive engagement between the engine and the drive train. It may be advantageous to shift the maximally retarded ignition angle in the advance direction with reference to a static combustion limit which is a function of a program map, since this permits an even more targeted adaptation to engine parameters. It may also be advantageous to advance the ignition only in a specific period of time after determining the dynamic without positive engagement, during which exhaust backfirings actually occur, in order to quickly make the entire ignition-angle range available again for an adjustment of the ignition angle. It likewise may prove to be advantageous to observe a waiting time after detecting the dynamic without positive engagement, so that a maximum ignition-angle range may still be made available over a longer period of time. For the same reason, it may be advantageous to cancel the ignition advance of the maximally retarded ignition angle immediately after detecting a positive engagement between the engine and drive train. Since the occurrence of exhaust backfirings is temperature-dependent, it may be advantageous to make the amount of the ignition advance, as well as the waiting time and the period of time in which the ignition advance is carried out temperature-dependent. For the same reason, it may be advantageous to take the quantity of secondary air blown into the exhaust tract into account for the amount of the ignition advance. This may be carried out with a small expenditure of memory, since the quantity of secondary air is taken into consideration with the aid of a weighting factor.

Another operating state in which exhaust backfirings may be avoided by a shift of the maximally retarded ignition angle in the advance direction occurs during the post-start. Here, a reduction in the emission of hydrocarbons may be achieved by the advance of the maximally retarded ignition angle, as well. It may prove to be advantageous to lead the advance shift of the maximally retarded ignition angle during the post-start slowly to the steady-state combustion limit, in order to prevent sudden torque changes. In the same way, it may advantageous to make the period of time, in which the maximally retarded ignition angle is led to the steady-state combustion limit, a function of the engine temperature and the quantity of secondary air blown into the exhaust tract, since the leading may thus be carried out in a manner that it is adapted optimally to the engine parameters, and an unnecessary ignition advance is avoided. Given a selection of a linear leading-to function of the maximally retarded ignition angle, the computing expenditure may be advantageously minimized. It may be also advantageous in the selection of the advance of the maximally retarded ignition angle during the post-start to take into account whether measures have been taken to heat the catalytic converter, for because of the influencing of temperature associated with them, they may cause an increased occurrence of backfirings in the exhaust.

DETAILED DESCRIPTION

Figure 1:
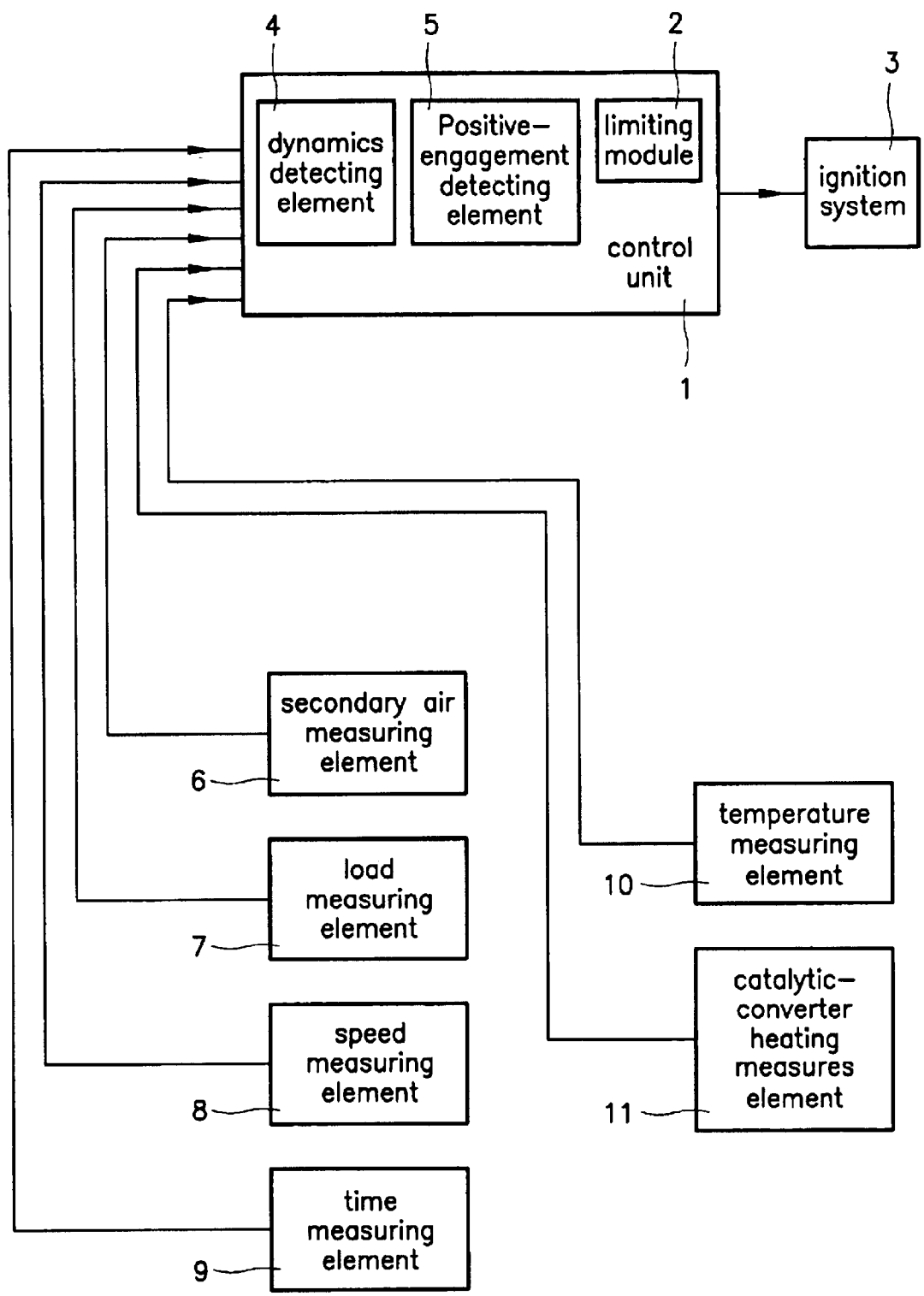
FIG. 1 shows schematically an exemplary device of the present invention for determining the ignition angle.

FIG. 1 shows an exemplary device of the present invention for determining the ignition angle of an internal combustion engine. The exemplary device for determining the ignition angle includes a control unit 1 equipped with a memory and a processing unit. Control unit 1 also contains a limiting module 2 which limits an ignition angle IA(setpoint), determined in light of engine information, to a maximally retarded value IA(max). The limiting is carried out in such a way that when the ignition angle determined from engine information is smaller than IA(max), then value IA(setpoint), and otherwise value IA(max) is passed on to ignition system 3. The transfer of an ignition-angle value from control unit 1 to ignition system 3 is shown in the drawing by a connecting line and an arrow.

The exemplary device of the present invention for determining the ignition angle also includes an element 4 for detecting dynamics, and an element 5 for detecting a positive engagement between the engine and the drive train. These elements may be integrated in control unit 1, but may also be located outside of control unit 1.

In addition, the exemplary device of the present invention includes an element 6 for measuring the quantity of secondary air, an element 7 for measuring load, an element 8 for measuring speed, an element 9 for measuring time, an element 10 for measuring engine temperature and an element 11 for determining catalytic-converter heating measures. The elements having reference numerals 6 through 11 measure operating parameters of an internal combustion engine and transmit values corresponding to the respective measured values to control unit 1. This is shown in FIG. 1 by connecting lines and arrows. Control unit 1 processes the parameters in its processing unit and determines ignition angle IA(setpoint) as a function of these parameters. This ignition angle IA(setpoint), as described, thereupon passes through the limiting module. The limiting module may also be arranged outside of the control unit.

Ignition system 3 contains electronics, one or more output stages, ignition coils, as well as one or more spark plugs. Control unit 1 controls the ignition system in such a way that the spark plug or spark plugs ignite at the ignition angle determined by control unit 1 and limiting module 2.

If a specific engine-speed gradient is exceeded or a specific change in the intake-manifold pressure per unit of time is exceeded, then element 4 for detecting dynamics recognizes that the internal combustion engine is in a dynamic state. Element 4 for detecting dynamics then supplies a first dynamics value JD. If the internal combustion engine is not in a dynamic state, then the element for detecting dynamics supplies a second dynamics value ND. This means that the so-called dynamics indicator has either first dynamics value JD or second dynamics value ND. Both first dynamics value JD and second dynamics value ND contain in each case a definitively specified value. In this context, the speed, for example, is measured by element 8 for measuring speed, and the value is passed on to control unit 1. Control unit 1 determines from it the engine-speed gradient and supplies this value to element 4 for detecting dynamics. Analogously, the intake-manifold pressure is detected by a sensor, and the change in the intake-manifold pressure is determined from it by control unit 1.

The element for detecting positive engagement between the engine and the drive train recognizes that there is no positive engagement when either the clutch is depressed, or no gear is engaged. The clutch position and the engaged gears are monitored by sensors located outside of control unit 1. They supply their measured values to the control unit, the information then also being processed by the element for detecting positive engagement. If no positive engagement exists between the engine and the drive train, then element 5 for detecting positive engagement supplies a first positive-engagement value NK. Otherwise, element 5 for detecting positive engagement supplies a second positive-engagement value JK. This means that the so-called positive-engagement indicator has either first positive-engagement value NK or second positive-engagement value JK. Both first positive-engagement value NK and second positive-engagement value JK contain in each case a fixed, predefined value.

Element 6 for measuring secondary air, with the aid of a flow-rate meter, measures what quantity of secondary air is blown into the exhaust tract. The measured value of the secondary-air quantity is passed on to control unit 1. Element 7 for measuring load measures, in light of the intake-manifold pressure, what charge the cylinder has. Alternatively, the charge may be determined by a hot-film air-mass meter (HFM) or in terms of the throttle-valve position. The element for measuring load transfers a load value, corresponding to the charge of the cylinder, to control unit 1. Element 8 for measuring speed measures the speed of the internal combustion engine, for example, in terms of the revolutions of the crankshaft, using an induction-type pulse generator or a Hall-effect sensor. The speed determined by element 8 for measuring speed is passed on to control unit 1. Element 9 for measuring time measures a time which has passed since the start of the engine or another specific point of time. The time values measured by element 9 for measuring time are passed on to control unit 1. Element 10 for measuring engine temperature measures the temperature of the engine cooling water. These temperature values are passed on to control unit 1.

Moreover, the exemplary device for determining the ignition angle contains an element 11 which determines whether measures have been taken to heat the catalytic converter. The catalytic converter may be heated when the engine has only been running a short time, or, if the engine has already been running, it has cooled off again. The element for determining the catalytic-converter heating measure passes on a first catalytic-converter heating value JH to control unit 1 when measures have been taken to heat the catalytic converter, and otherwise passes on a second catalytic-converter heating value NH to control unit 1. Both first catalytic-converter heating value JH and second catalytic-converter heating value NH contain in each case a fixed, predefined value. The elements of an internal combustion engine designated by reference numerals 4 through 11 continually ascertain the values to be passed on to the control unit, and also transmit these values continually to the control unit. All the elements described in FIG. 1 are components of an exemplary device according to the present invention for determining the ignition angle in an internal combustion engine. The elements having reference numerals 4 through 11 may be combined in any way as desired, or else may be integrated into control unit 1.

Figure 2:
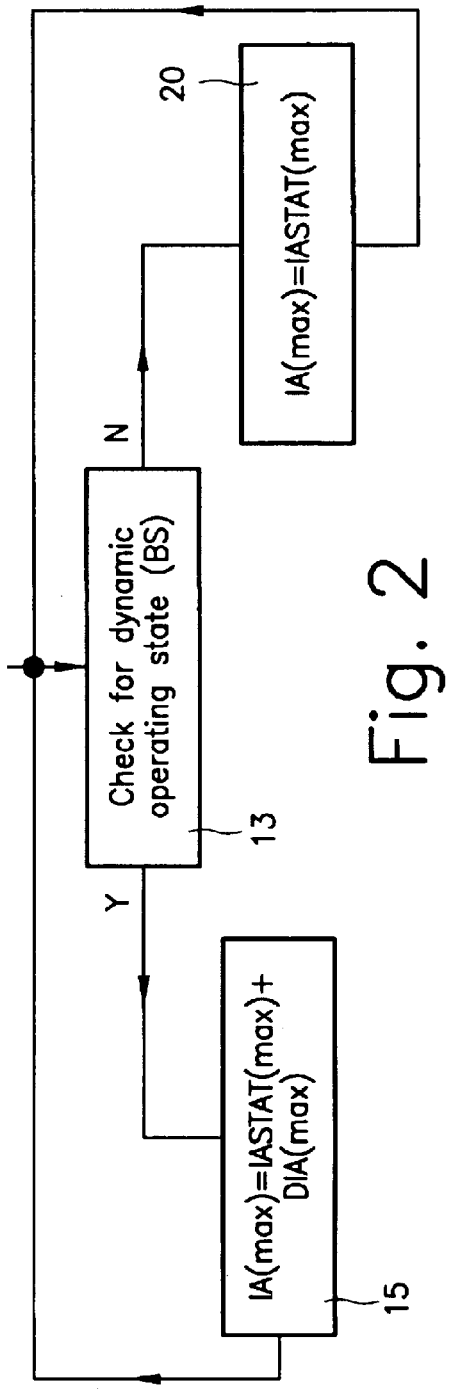
FIGS. 2 through 11 show schematically in flow charts, different exemplary methods of the present invention for determining the ignition angle.

FIG. 2 describes an exemplary method of the present invention for determining the ignition angle of an internal combustion engine. In step 13, the control unit checks whether a specific operating state, a so-called dynamic operating state (BS), has occurred. If such an operating state has commenced, then maximally retarded ignition angle IA(max) is yielded from the sum of static combustion limit IASTAT(max) and a differential ignition angle DIA(max), which has a positive value. In this context, the ignition angle shifts in the advance direction are counted positive, and the ignition angle shifts in the retard direction are counted negative. Thus, the maximally retarded ignition angle, with respect to static combustion limit IASTAT(max), is advanced by the value of differential ignition angle DIA(max). This calculation of maximally retarded ignition angle IA(max) is carried out in step 15. If a dynamic operating state BS has not commenced, then the exemplary method jumps to step 20, in which maximally retarded ignition angle IA(max) is yielded from static combustion limit IASTAT(max). If the maximally retarded ignition angle is ascertained according to step 15 or 20, this calculation being carried out by control unit 1, then the calculated value of maximally retarded ignition angle IA(max) is passed on to limiting module 2. The exemplary method thereupon jumps back again to step 13. Static combustion limit IASTAT(max) may be read out from the memory of control unit 1 from a load- and speed-dependent program map. The load and the speed of the engine are measured by elements 7 and 8, respectively.

Figure 3:
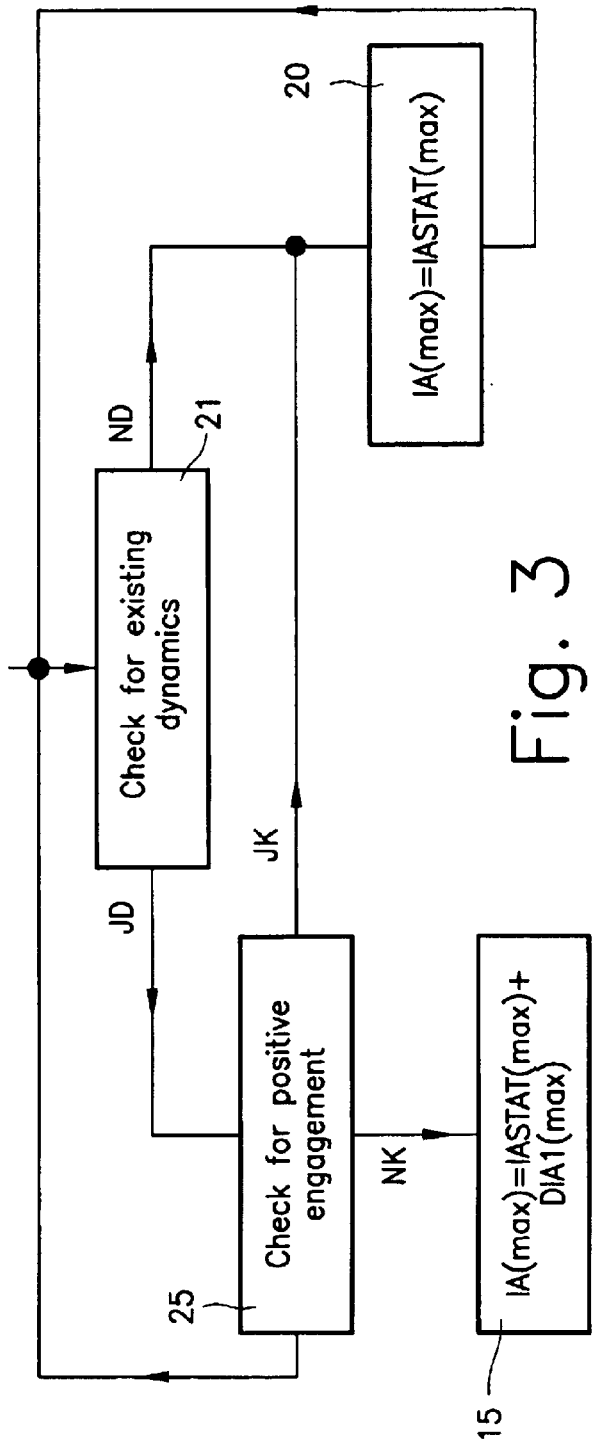

FIG. 3 shows a further exemplary embodiment of a exemplary method according to the present invention. The exemplary method first passes through step 21, in which the control unit queries the value supplied to the control unit by element 4 for detecting dynamics. If element 4 for detecting dynamics supplies a first dynamics value JD to the control unit, then in the next step 25, element 5 for detecting positive engagement between the engine and drive train is queried for the corresponding value. If first positive-engagement value NK is applied to the control unit, then the exemplary method is continued with step 15. Analogous to FIG. 2, step 15 contains a timing advance of the maximum ignition angle by the amount of a differential ignition angle. Here, the corresponding differential ignition angle bears the designation first differential ignition angle DIA1(max). If element 4 for detecting dynamics supplies second dynamics value ND to control unit 1, then the exemplary method is continued with step 20. If element 5 for detecting a positive engagement between engine and drive train supplies second positive-engagement value JK to the control unit, then the exemplary method is likewise continued with step 20. In the same way as in FIG. 2, step 20 includes that the maximally retarded ignition angle results from static combustion limit IASTAT(max). As up till now, in the further description of the exemplary embodiments, identical reference numerals denote identical method steps. After a calculation of maximally retarded ignition angle IA(max) either with the aid of step 15 or using step 20, the exemplary method jumps again to step 21.

The conditions formulated in step 21 and in step 25 yield a first dynamic operating state BD1. It is characterized in that the internal combustion engine is in a dynamic state, and at the same time, no positive engagement exists between the engine and drive train. Such an operating state may be illustrated in terms of a revving-up. Such a revving-up is caused, for example, by quickly depressing the accelerator and thereupon quickly releasing it again. During the release of the accelerator, the control unit receives the demand to reduce torque. In general, this is done via the ignition angle. The torque may be reduced via the ignition angle in such a way that the ignition angle is shifted in the retard direction. In general, this timing retard of the ignition angle reaches up to the maximally retarded ignition angle. Due to the change in pressure, which occurs suddenly in response to revving-up, injected, but not yet vaporized fuel, which is present in the intake tract as wall film, is sucked into the combustion chamber in which too rich a mixture is then present. Given an ignition angle corresponding to the static combustion limit, this mixture cannot be completely burned. Therefore, islands of unburned or partially burned mixture get into the exhaust tract. Because of the high temperatures prevailing in the exhaust tract, self-ignition of these unburned or partially burned islands may occur. The reactions may be intensified by the blowing in of secondary air. The secondary reactions in the exhaust tract are known as exhaust backfirings or backfirings. These exhaust backfirings may be avoided if the maximally retarded ignition angle does not correspond to the static combustion limit, but rather is shifted to more advanced ignition angles. Then, even given too rich a mixture, the combustion is carried out completely, and no unburned or partially burned mixture is present any longer in the exhaust. Thus, as described in step 15, in response to revving-up, i.e. given the presence of dynamics without positive engagement between engine and drive train, maximally retarded ignition angle IA(max) may be required to be shifted in the advance direction by the amount of a first differential ignition angle DIA1(max). In this context, first differential ignition angle DIA1(max) may be selected as a function of temperature. For example, DIA1(max) may be stored in a temperature-dependent characteristic curve in a memory. Such a temperature dependence of first differential ignition angle DIA1(max) may be advantageous because the combustion, that is to say, the completeness of the combustion, is influenced by the engine temperature. The temperature of the intake air is measured by element 10 for determining temperature.

Figure 4:
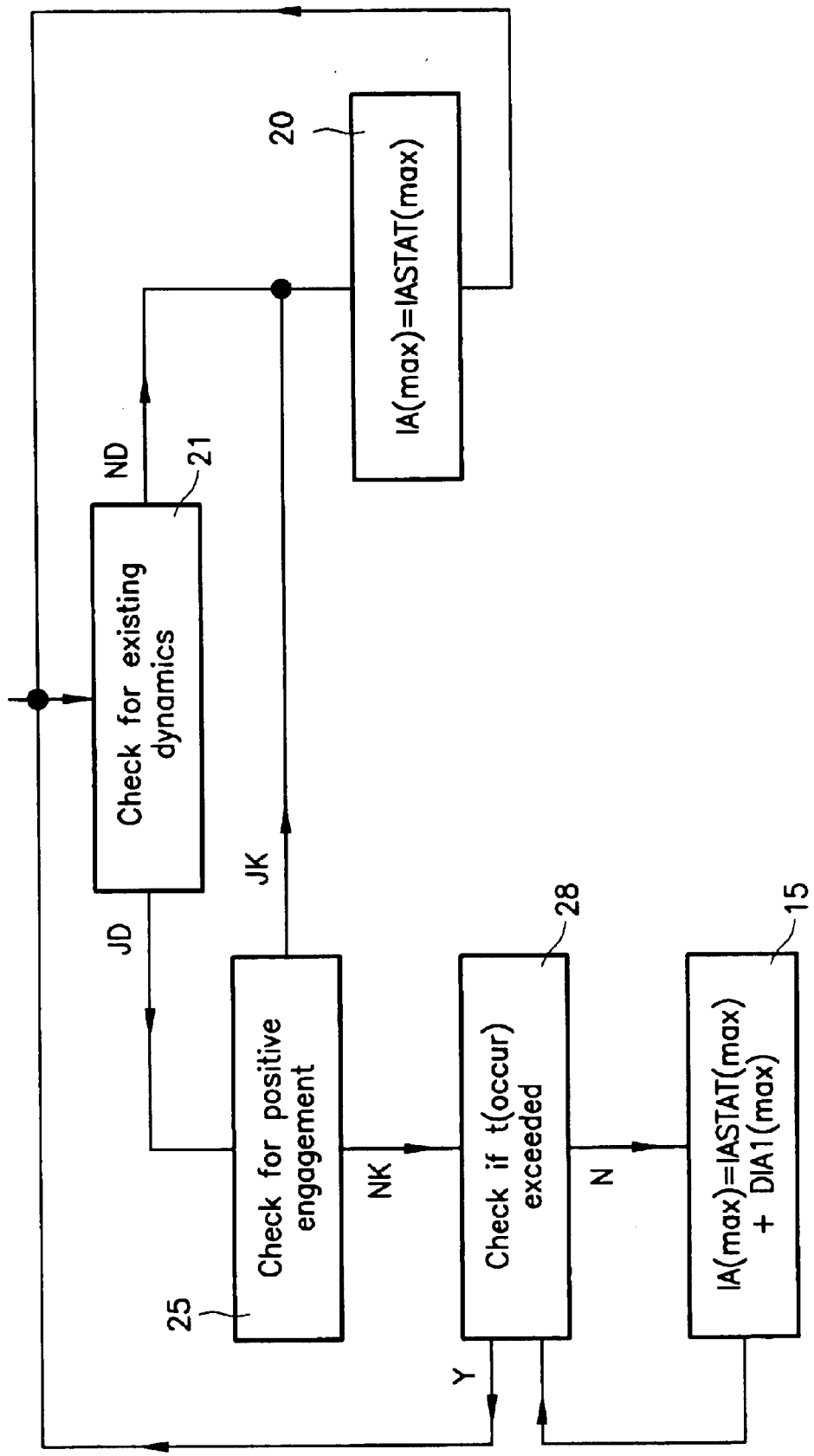

FIG. 4 shows a further exemplary embodiment of an exemplary method for determining the ignition angle. Steps 21, 25 and 20 correspond to the steps having the same reference numerals in FIG. 3, and therefore are not described again separately. If element 5 for detecting a positive engagement between engine and drive train detects that no positive engagement exists, then the exemplary method passes through a new step 28 in which it is checked whether the exemplary method has already exceeded a so-called occur time t(occur) since determining a first dynamic operating state BD1. If this is not the case, then the exemplary method arrives at step 15, which again corresponds to step 15 in FIG. 3. If occur time t(occur) has been exceeded, then the exemplary method arrives at step 21. Achieved by the new step 28 is that, before a new check of the operating state of the engine is carried out, initially within a specific period of time, occur time t(occur), the ignition angle is shifted in the advance direction. It has turned out that, within this applicable occur time t(occur), exhaust backfirings occur with increasing frequency, so that a timing advance of the maximally retarded ignition angle within occur time t(occur) is useful. This occur time t(occur) may be contained in the control unit in a temperature-dependent characteristic curve. This may be advantageous, since the combustion, and therefore also the length of the period of time in which exhaust backfirings occur, is a function of the engine temperature.

Figure 5:
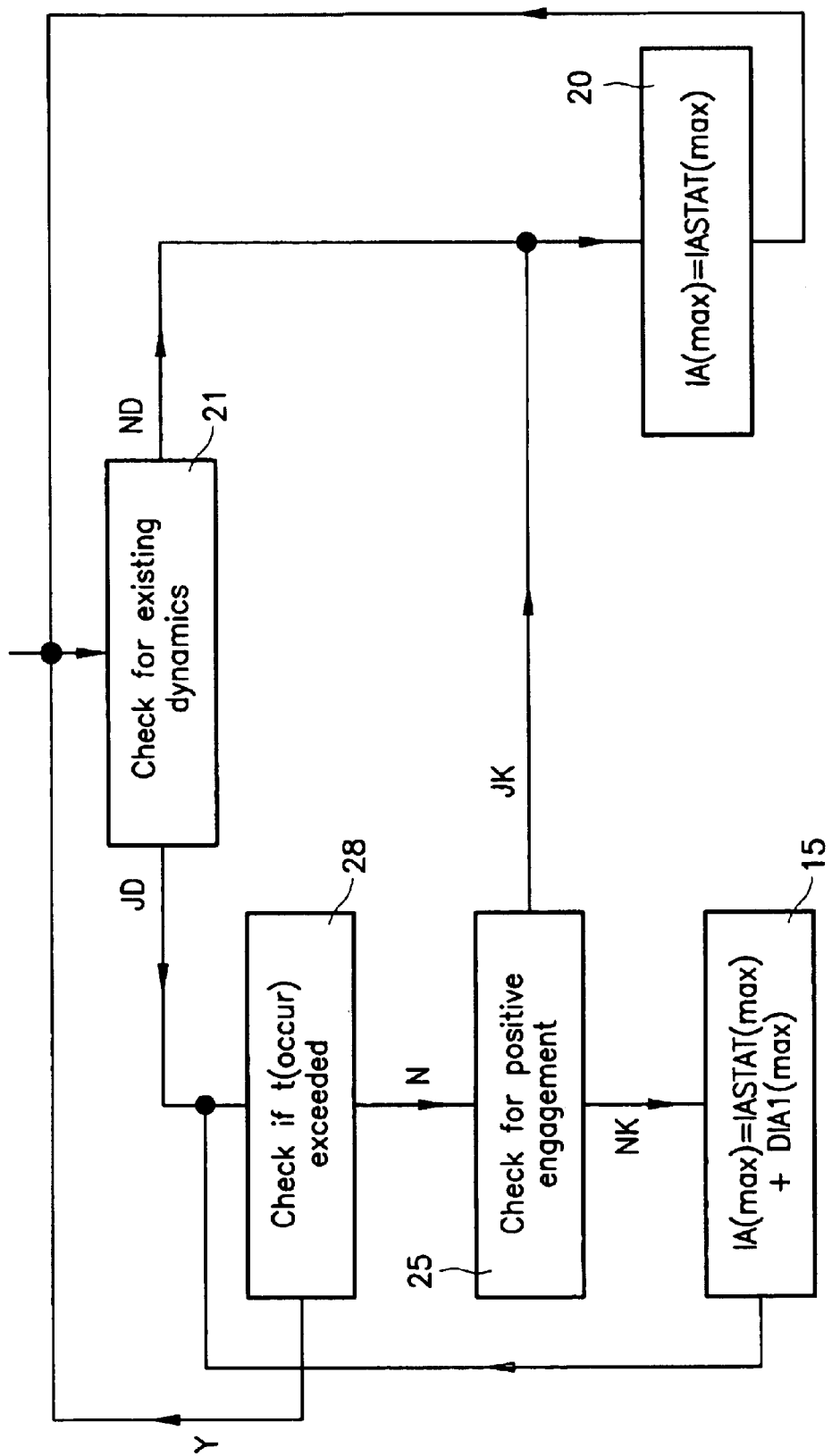

The further exemplary embodiment of the exemplary method according to the present invention shown in FIG. 5 contains the same steps as the exemplary embodiment shown in FIG. 4. Therefore, the individual steps are not explained once again. The exemplary method shown in FIG. 5 differs from the exemplary method shown in FIG. 4 in that, after maximally retarded ignition angle IA(max) has been calculated in step 15, and occur time t(occur) is not yet exceeded (step 28), it is checked once more whether a positive engagement between engine and drive train exists in step 25. If this is the case, then the exemplary method jumps immediately to step 20, in which the maximally retarded ignition angle results from static combustion limit IASTAT (max). With the aid of the exemplary method according to the present invention shown in FIG. 5, it is possible to react immediately if a positive engagement exists between engine and drive train. This may be advantageous, since in response to a positive engagement, which, for example, may be triggered by engaging the clutch, vibrations occur in the drive train which may require correction by interventions in the ignition angle. To that end, the presence of a maximum ignition-angle range, which extends up to static combustion limit IASTAT(max), is desirable. In this context, exhaust backfirings possibly occurring for a brief period after the engagement of the clutch may be tolerated. Since, however, the engine is decelerated by the process of engaging the clutch, the dynamics of the engine are reduced such that secondary reactions in the exhaust caused by the dynamics are removed very quickly.

Figure 6:
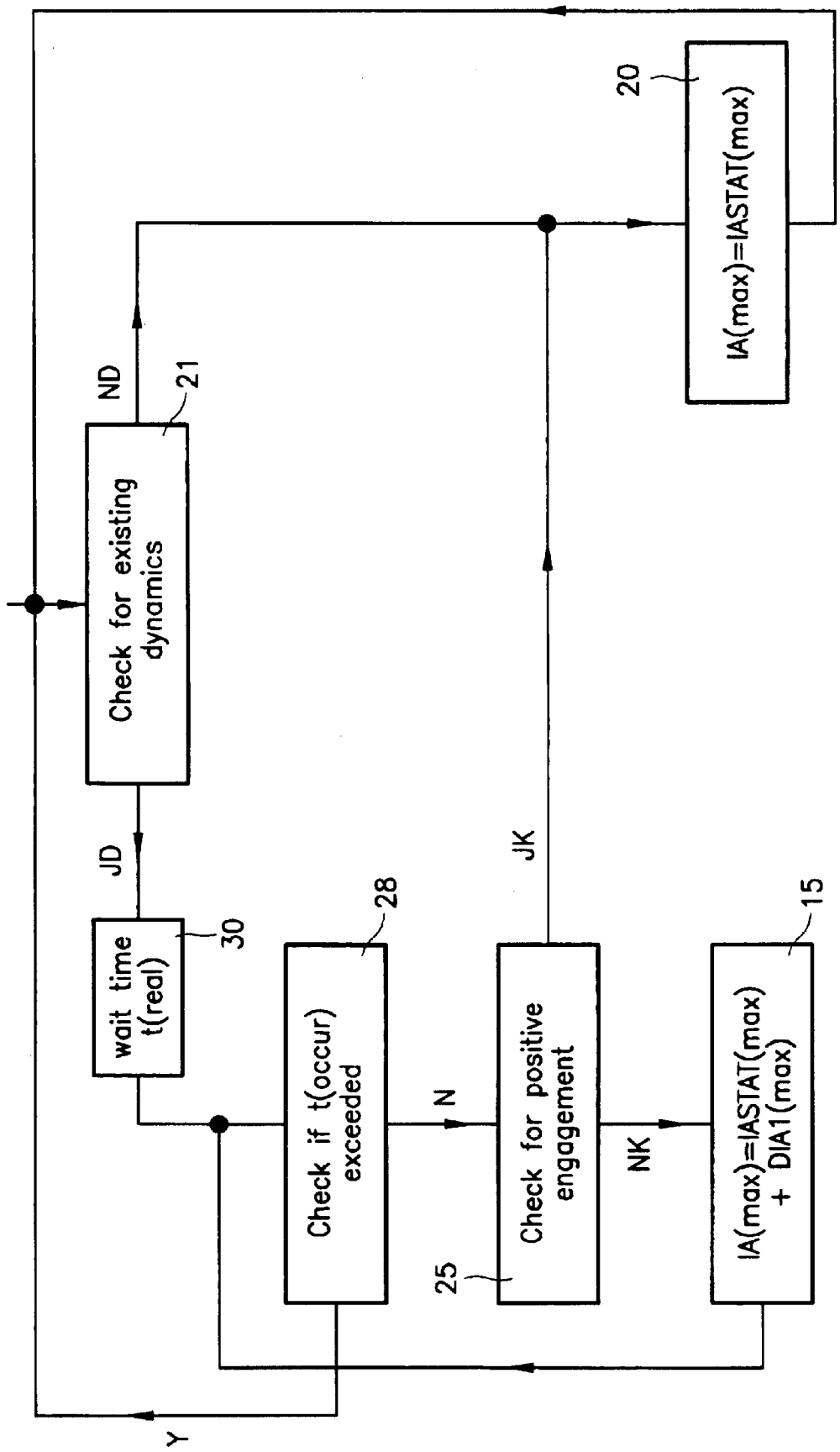

FIG. 6 shows another exemplary embodiment of the exemplary method according to the present invention for determining the ignition angle of an internal combustion engine. It differs from the exemplary method presented in FIG. 5, in that a step 30 is inserted which is carried out after step 21. This step 30 includes the waiting of a waiting time t(reac) after element 4 for detecting dynamics has detected a dynamic in step 21. This waiting time t(reac) is observed before, in step 25, element 5 for detecting positive engagement between engine and drive train checks whether or not a positive engagement exists between the engine and drive train. The implementation of such a step 30, in which a waiting time t(reac) is observed, may be advantageous, since secondary reactions in the exhaust may occur only after this waiting time t(reac). This time t(reac) is applicable. Furthermore, waiting time t(reac) may be available in a temperature-dependent characteristic curve in control unit 1. This is because, as already presented in the clarification of the previous exemplary embodiments, the combustion, and therefore also the period of time for the occurrence of exhaust backfirings, is a function of the engine temperature.

Figure 7:
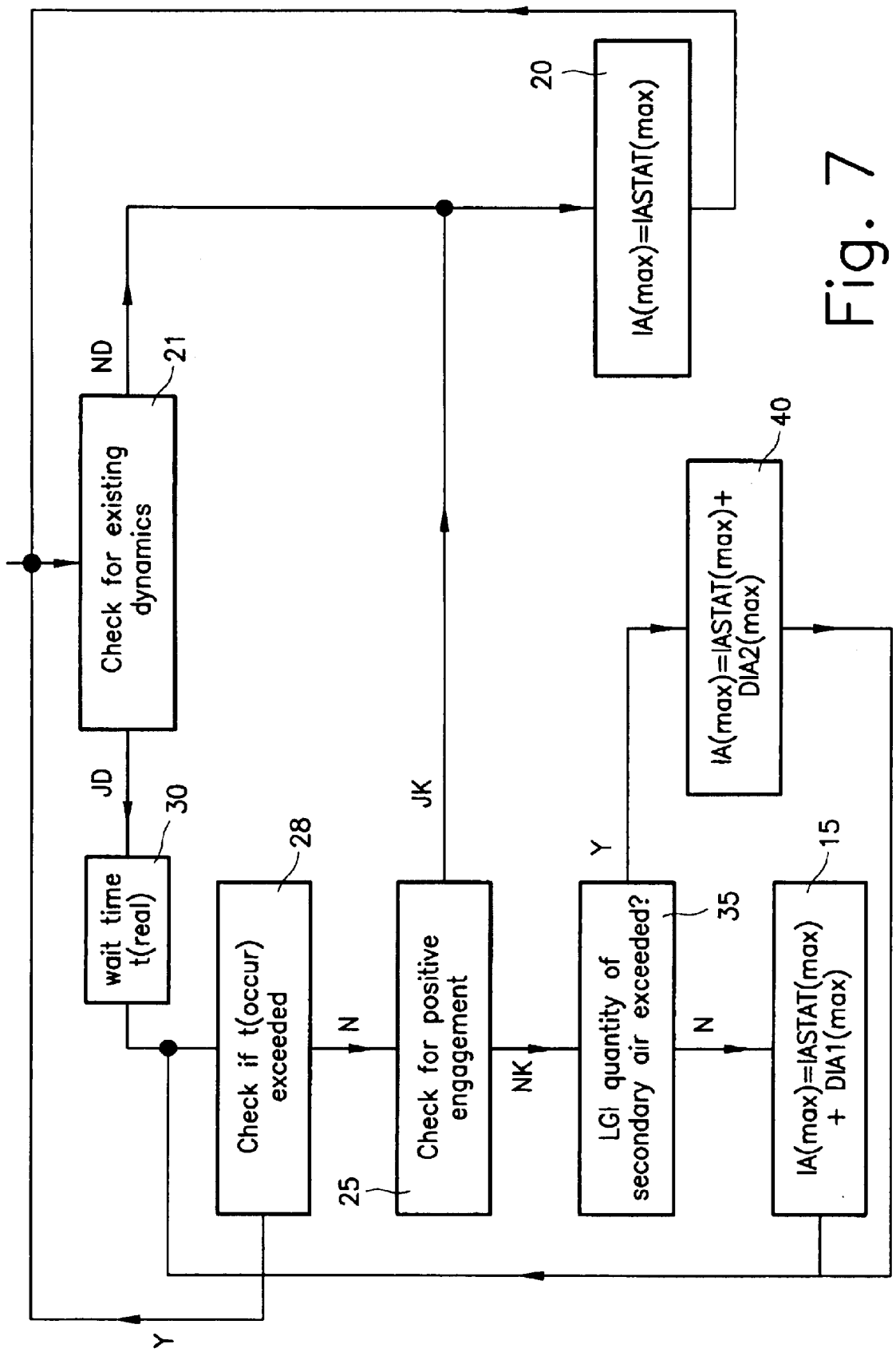

FIG. 7 shows a further exemplary embodiment of a exemplary method according to the present invention for determining the ignition angle of an internal combustion engine. This exemplary method differs from the exemplary method presented in FIG. 6 in terms of the additionally inserted steps 35 and 40 Therefore, the remaining steps are not explained again. If, in step 28, the query after elapsed occur time t(occur) reveals that the time after detecting the dynamics is less than occur time t(occur), then the exemplary method jumps to step 35, in which the control unit queries the value of the secondary-air quantity transmitted by the element for measuring secondary air. If this value is greater than a first limiting value LG1, then the exemplary method jumps to step 40. In this step 40, maximally retarded ignition angle IA(max) is calculated as the sum of static combustion limit IASTAT(max) and a second differential ignition angle DIA2(max). If the quantity of secondary air in step 35 has not exceeded first limiting value LG1, then the exemplary method jumps to step 15, in which, as already in the exemplary methods of the present invention presented in FIGS. 2 through 6, the maximally retarded ignition angle is calculated as the sum of a first differential ignition angle DIA1(max) and static combustion limit IASTAT(max). After passing step 15 or step 40, the exemplary method jumps back to step 28.

The quantity of secondary air blown into the exhaust tract influences the igniting of the islands of unburned or partially burned fuel. Thus, the quantity of secondary air blown into the exhaust tract influences the development of exhaust backfirings. If the quantity of secondary air blown in exceeds a critical value, exhaust backfirings may occur with increased frequency. Therefore, here a further timing advance of the maximally retarded ignition angle with respect to static combustion limit IASTAT(max) is desirable. Accordingly, upon exceeding a specific quantity of secondary air blown in, another second differential ignition angle DIA2(max) may need to be taken into account. This operating state is also designated as second dynamic operating state BD2. Second differential ignition angle DIA2(max) may also be obtained from first differential ignition angle DIA1(max) by multiplication with a first weighting factor F1. This factor requires a value greater than 1. Second differential ignition angle DIA2(max) and first weighting factor F1, respectively, may in turn be set in the application.

Analogous to DIA1(max), second differential ignition angle DIA2(max) and the first weighting factor, respectively, may be contained in control unit 1 in a temperature-dependent characteristic curve. It is also possible for a plurality of first limiting values to exist for the quantity of secondary air blown in. New second differential ignition angles DIA2 (max) and first weighting factors F1, respectively, may be stored in the control unit for each first limiting value.

Figure 8:
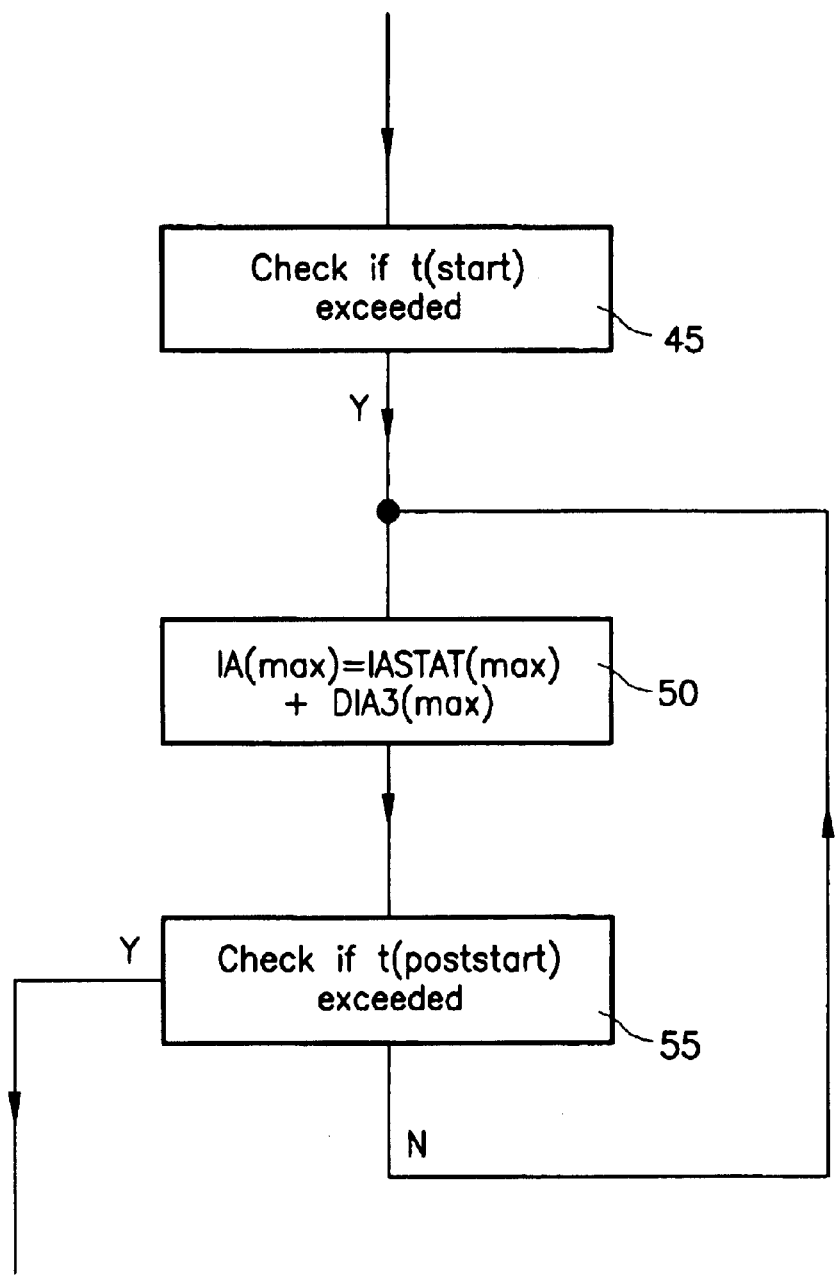

FIG. 8 shows a further exemplary embodiment of the exemplary method according to the present invention for determining the ignition angle. In step 45, it is queried whether the value, provided to the control unit by the element for measuring time, has exceeded a time value, start time t(start). If this is not the case, then there is a wait for a specific time, and step 45 is again carried out with the time query. If a start time t(start) is exceeded, then the exemplary method jumps to step 50, in which the maximally retarded ignition angle is yielded as the sum of a third differential ignition angle DIA3(max) and static combustion limit IASTAT(max). The exemplary method thereupon jumps to step 55, in which the control unit queries the value provided by the element for measuring time. If a post-start time t(poststart) is not exceeded, then the exemplary method jumps once more to step 50. If this post-start time t(poststart) is exceeded, then the exemplary method is continued, in general in that the maximally retarded ignition angle is yielded from the static combustion limit. One of the exemplary methods described in FIGS. 2 through 7 may also follow. This dynamic operating state, in which a third differential ignition angle DIA3(max) yields a timing advance of the maximally retarded ignition angle with respect to the static combustion limit, is designated as third dynamic operating state BD3. This operating state is achieved within a period of time between start time t(start) and post-start time t(poststart), the so-called post-start phase. An occurrence of exhaust backfirings and an intensified emission of hydrocarbons, which develop due to the unburned or partially burned mixture getting into the exhaust, has been measured for this operating state, as well. Therefore, a timing advance of the maximally retarded ignition angle with respect to static combustion limit IASTAT(max) may also be advantageous here. Prior to start time t(start), the maximally retarded ignition angle assumes a maximally retarded start-time ignition angle IAS(max) which lies at more advanced ignition angles with respect to IASTAT(max).

Figure 9:
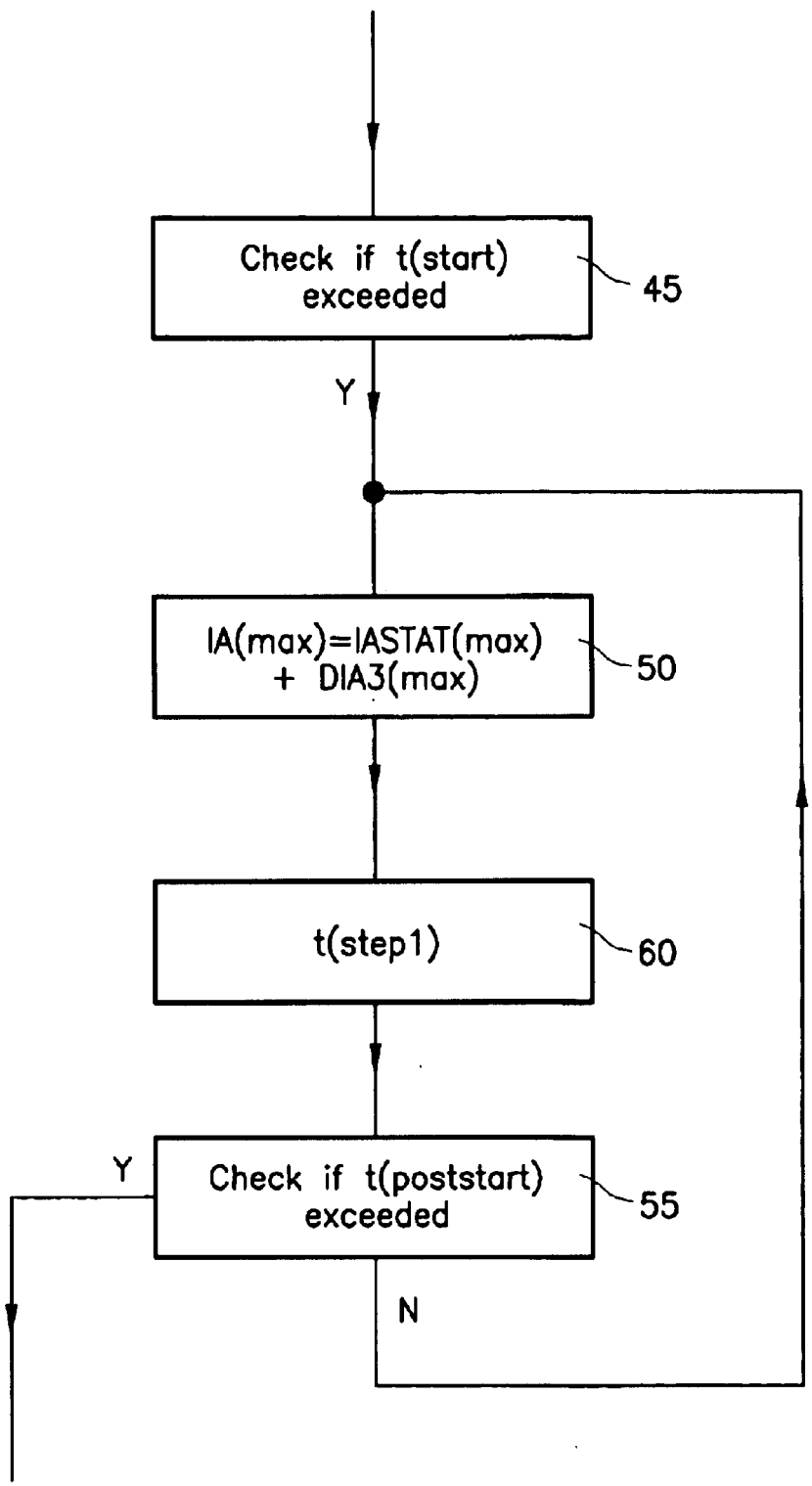

FIG. 9 shows another exemplary embodiment for a exemplary method according to the present invention. This exemplary method is analogous to the exemplary method described in FIG. 8, but additionally includes step 60. After the maximally retarded ignition angle has been calculated as the sum of third differential ignition angle DIA3(max) and static combustion limit IASTAT(max) in step 50, the exemplary method reaches step 60. In this step 60, a time meter t is increased by a first time step t(step1). This first time step t(step1) was initialized at the point of time when step 50 was passed through for the first time. After the time meter has been increased by a first time step t(step1) in step 60, the exemplary method reaches step 55.

In the exemplary method of the present invention shown in FIG. 9, third differential ignition angle DIA3(max) is calculated as function Fc of time meter t in control unit 1. Since the time meter is increased by a first time step t(step1) with each pass-through of the loop, differential ignition angle DIA3(max) changes in response to each pass-through of the loop. In this context, the loop is made of steps 50, 60 and 55. Function Fc, stored in control unit 1, for third differential ignition angle DIA3(max) is a monotonically decreasing function Fc of the time meter. The value range of function Fc(t) may lie between the values 0 and the difference between maximally retarded start-time ignition angle IAS(max) and static combustion limit IASTAT(max). Thus, it is possible to shift the maximally retarded ignition angle, which results as the sum of third differential ignition angle DIA3 as function of t, and static combustion limit IASTAT (max), slowly to more retarded ignition angles, until maximally retarded ignition angle IA(max) has reached the value of static combustion limit IASTAT(max). This may be advantageous, since sudden changes in torque are thereby avoided. In this context, it is possible to establish first time step t (step1) in control unit 1 as a function of the temperature. This may be advantageous, since the size of first time step t (step1) determines the length of the post-start phase. If the engine temperature is high, then exhaust backfirings and stronger hydrocarbon emissions, respectively, occur only in a smaller period of time after ending the start phase. Thus, the post-start phase may be made shorter with a greater value for the first time step. However, if the engine temperature is low, then exhaust backfirings and hydrocarbon emissions occur within a longer period of time after ending the start phase. Consequently, the value of the first time step may then need to be selected to be smaller. Furthermore, monotonically decreasing function Fc may represent a linear function of the time meter. This may be advantageous, since the computing time in the control unit is minimized by the simple formation of function Fc.

Figure 10:
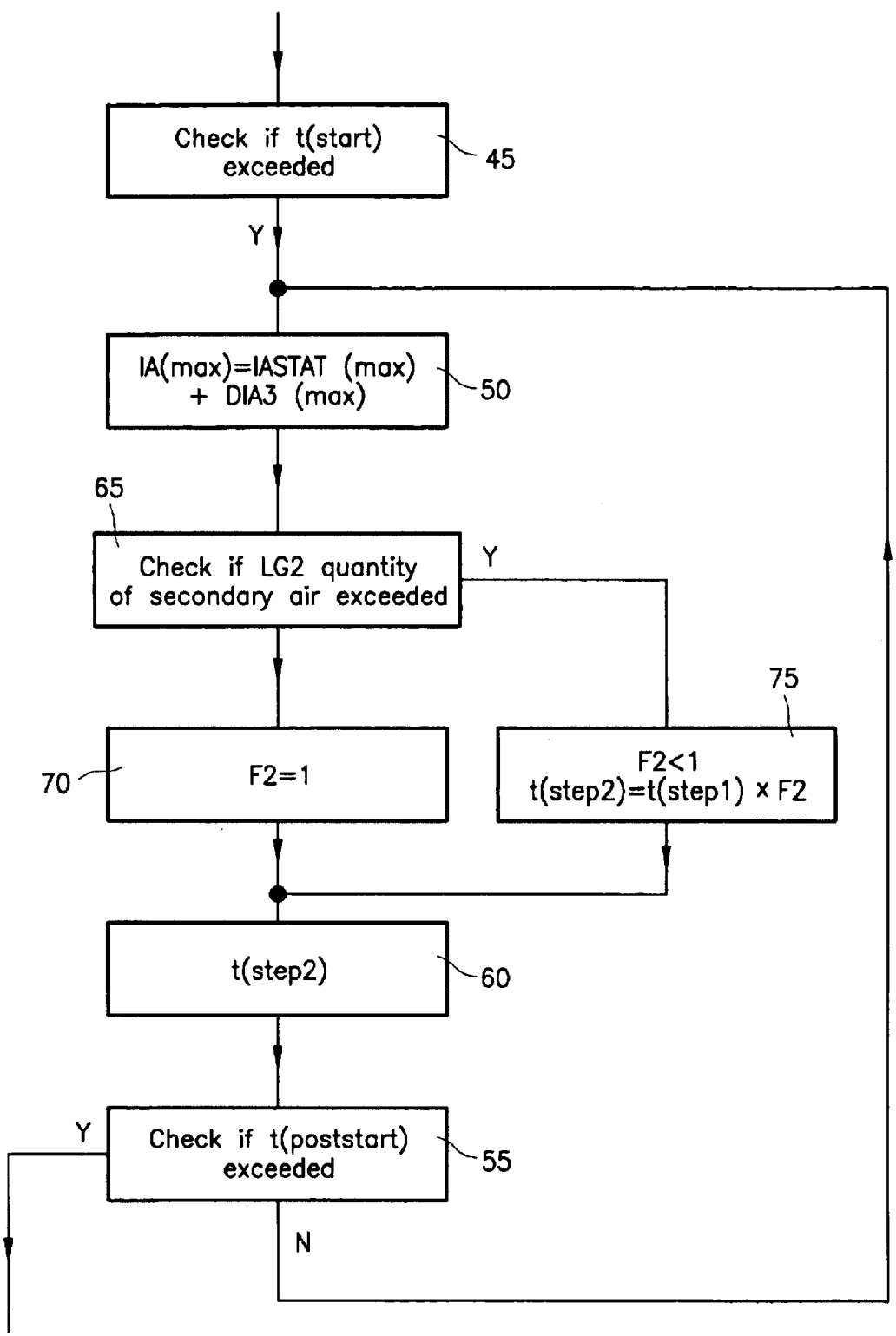

FIG. 10 shows a further exemplary embodiment of the exemplary method according to the present invention for determining the most retarded ignition angle. The exemplary method differs from the exemplary method presented in FIG. 9 by the additional insertion of exemplary method steps 65, 70 and 75. After the maximally retarded ignition angle has been calculated in step 50 as the sum of a third differential ignition angle DIA3(max) and the static combustion limit, the exemplary method reaches step 65. In this step 65, the value which element 6 for measuring the secondary air provides to the control unit is queried. This value contains the quantity of secondary air blown into the exhaust tract. If the quantity of secondary air measured in step 65 is less than a second limiting value LG2, then the exemplary method arrives at step 70, in which the value 1 is assigned to a second weighting factor F2. If the quantity of secondary air blown in is greater than second limiting value LG2, then the exemplary method arrives at step 75. In this step 75, second weighting factor F2 is assigned a value smaller than 1 in control unit 1. The value of first time step t (step1) is multiplied by this second weighting factor F2, which was determined either in step 75 or in step 70, the product being designated by second time step t(step2), before time meter 1 is now increased by second time step t (step2) in step 60. Realized in the exemplary method of the present invention shown in FIG. 10 is that when a specific value of a secondary-air quantity LG2 is exceeded, the shift of the ignition angle in the advance direction in the post-start is carried out over a longer period of time. This lengthening of the post-start phase may be advantageous, since if a specific secondary-air quantity is exceeded, exhaust backfirings may occur with increasing frequency.

Figure 11:
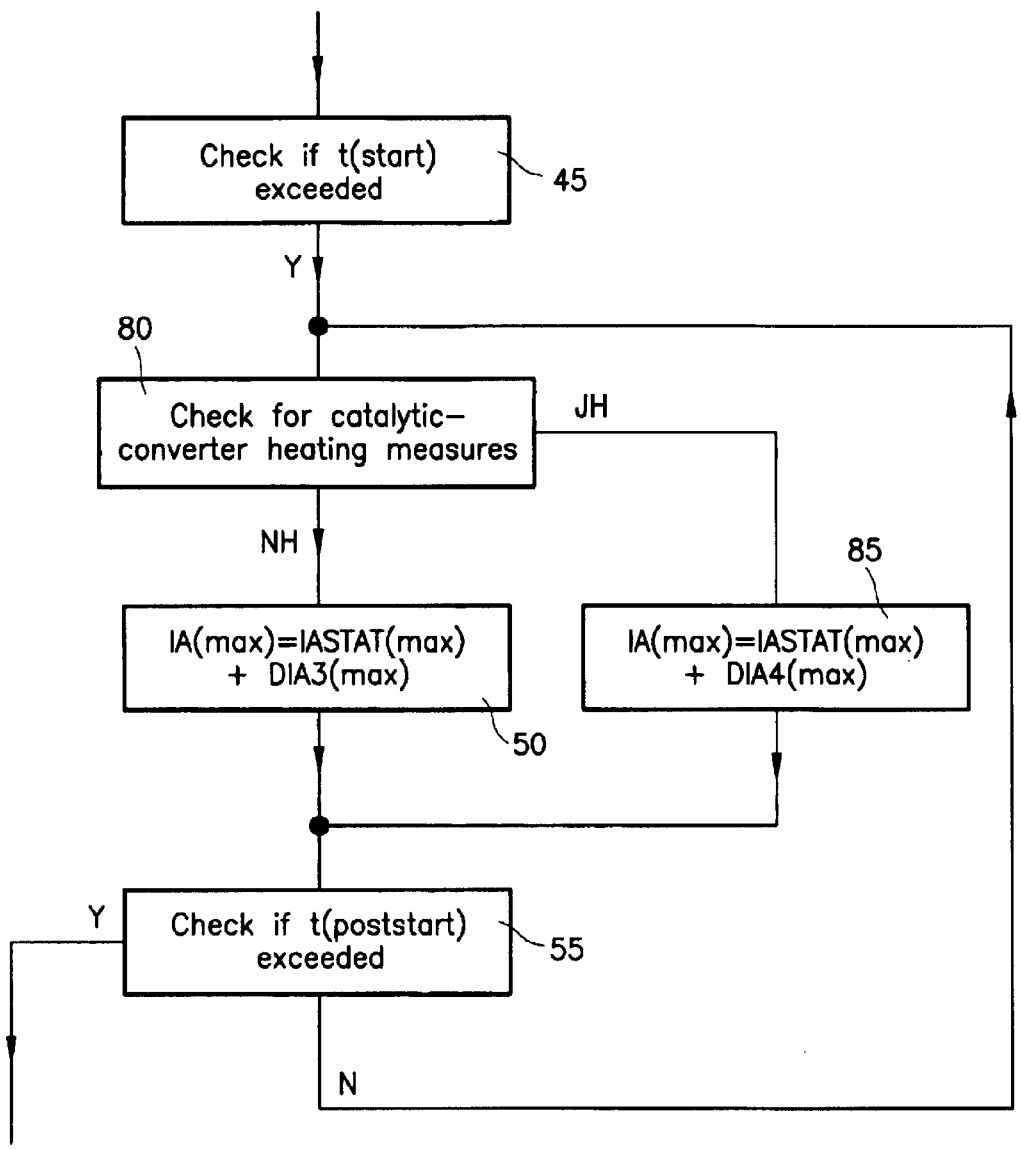

FIG. 11 shows a further exemplary embodiment of a exemplary method according to the present invention. The exemplary embodiment in FIG. 11 differs from the exemplary embodiment shown in FIG. 8 by the insertion of steps 80 and 85. As described in the explanations with respect to FIG. 8, after a start time t(start) has been exceeded (step 45), the exemplary method arrives at step 80 in which it is asked whether element 11 for determining catalytic-converter heating measures has supplied a first catalytic-converter heating value JH or a second catalytic-converter heating value NH to control unit 1. This means, it is asked whether or not the catalytic converter is heated. If element 11 has supplied second catalytic-converter heating value NH to control unit 1, i.e. when no catalytic converter heating is carried out, then the exemplary method reaches step 50 in which the maximally retarded ignition angle is formed as the sum of third differential ignition angle DIA3(max) and the static combustion limit. The exemplary method is thereupon continued as was described with reference to FIG. 8. If in step 80, element 11 for determining catalytic-converter heating measures supplies first catalytic-converter heating value JH to control unit 1, i.e. catalytic converter heating is carried out, then the exemplary method reaches step 85 in which the maximally retarded ignition angle is formed as the sum of a fourth differential ignition angle DIA4(max) and the static combustion limit. The so-called fourth dynamic operating state BD4 has then commenced. Thereupon, the exemplary method continues analogous to the exemplary method described in FIG. 8. Therefore, if the catalytic converter is being heated, a fourth differential ignition angle (DIA4(max)), different than without catalytic-converter heating, is taken into account for the maximally retarded ignition angle. This may be advantageous, since the occurrence of exhaust backfirings is a function of temperature, and with the implementation of catalytic-converter heating measures, the temperature in the exhaust tract is changed.

Analogous to third dynamic operating state BD3, as presented in FIGS. 9 and 10, for fourth dynamic operating state BD4, a time-dependent change of fourth differential ignition angle DIA4(max), which may be represented in a linear function of the time, may be carried out. The values of fourth differential ignition angle DIA4(max), analogous to DIA3(max), may lie in a range between zero and the difference between maximally retarded start-time ignition angle IAS(max) and static combustion limit IASTAT(max). In this context, the width of first time step t(step1) may likewise be made a function of the temperature. In the same way, for the width of the time step for the time-dependence of fourth differential ignition angle DIA4(max), the quantity of secondary air blown in may be taken into account analogous to the time-step-width dependence of third differential ignition angle DIA3(max).

What is claimed is:

1. A device for determining an ignition angle of an internal combustion engine, comprising:

a limiting module configured to limit a setpoint ignition angle to a maximally retarded ignition angle for an operation of the engine, the setpoint ignition angle optimized as a function of operating parameters of the engine; and a control unit containing functions to differentiate between a steady operating state and at least one dynamic operating state, wherein in the steady operating state, the maximally retarded ignition angle assumes a value of a static combustion limit; and wherein for each dynamic operating state, the control unit contains at least one differential ignition angle which, upon occurrence of a respective dynamic operating state, is configured to bring about a shift of the maximally retarded ignition angle to more advanced ignition angles with respect to the static combustion limit.

2. The device of claim 1, wherein the value of the static combustion limit is obtainable from at least one of a speed-dependent and a load-dependent program map stored in the control unit.

3. The device of claim 1, wherein the maximally retarded ignition angle is an absolute angle.

4. A device for determining an ignition angle of an internal combustion engine, comprising:
- a limiting module configured to limit a setpoint ignition angle to a maximally retarded ignition angle for an operation of the engine, the setpoint ignition angle optimized as a function of operating parameters of the engine; and
- a control unit containing functions to differentiate between a steady operating state and at least one dynamic operating state,
  - wherein in the steady operating state, the maximally retarded ignition angle assumes a value of a static combustion limit; and
  - wherein for each dynamic operating state, the control unit contains at least one differential ignition angle which, upon occurrence of a respective dynamic operating state, is configured to bring about a shift of the maximally retarded ignition angle to more advanced ignition angles with respect to the static combustion limit;
- a dynamics indicator configured to detect a dynamic, the dynamics indicator exhibiting a first dynamics value in response to detecting an existing dynamic and otherwise exhibiting a second dynamics value; and
- a positive-engagement indicator configured to detect a positive engagement between the engine and a drive train, the positive-engagement indicator exhibiting a second positive-engagement value in response to detecting an existing positive engagement and otherwise a first positive-engagement value,
- wherein a first dynamic operating state results when the dynamics indicator exhibits the first dynamics value and the positive-engagement indicator exhibits the first positive-engagement value, at least one first differential ignition angle being present in the control unit for the first dynamic operating state.

5. The device of claim 4, wherein the maximally retarded ignition angle is shifted during an occur time.

6. The device of claim 5, wherein the maximally retarded ignition angle is shifted after a waiting time has elapsed after detecting the first dynamic operating state.

7. The device of claim 4, wherein the control unit provides a switching function configured to make a switch back into the steady operating state immediately after the positive-engagement indicator exhibits the second positive-engagement value.

8. The device of claim 4, wherein the control unit contains values of the at least one first differential ignition angle in a temperature-dependent characteristic curve.

9. The device of claim 6, wherein the control unit contains values of at least one of the waiting time and the occur time in a temperature-dependent characteristic curve.

10. The device of claim 6, wherein at least one value of the waiting time and at least one value of the occur time are set in an application.

11. The device of claim 4, further comprising:
- an element for measuring a quantity of secondary air present;
- wherein a second dynamic operating state results when the dynamics indicator exhibits the first dynamics value and the positive-engagement indicator exhibits the first positive-engagement value and the quantity of secondary air exceeds a first limiting value, at least one second differential ignition angle being present in the control unit, as a function of the first limiting value, for the second dynamic operating state.

12. The device of claim 11, wherein at least one value of the second differential ignition angle for the second dynamic operating state is derived from at least one value of the first differential ignition angle by multiplication with a first weighting factor, the first weighting factor being a function of the first limiting value.

13. A device for determining an ignition angle of an internal combustion engine, comprising:
- a limiting module configured to limit a setpoint ignition angle to a maximally retarded ignition angle for an operation of the engine, the setpoint ignition angle optimized as a function of operating parameters of the engine;
- a control unit containing functions to differentiate between a steady operating state and at least one dynamic operating state,
  - wherein in the steady operating state, the maximally retarded ignition angle assumes a value of a static combustion limit; and
  - wherein for each dynamic operating state, the control unit contains at least one differential ignition angle which, upon occurrence of a respective dynamic operating state, is configured to bring about a shift of the maximally retarded ignition angle to more advanced ignition angles with respect to the static combustion limit; and
- an element to perform a time measurement;
- wherein a first dynamic operating state results when a start time is exceeded and a post-start time falls short of a defined value, a processing unit of the control unit supplying at least one first differential ignition angle for the first dynamic operating state.

14. The device of claim 13, further comprising:
- an element for monitoring whether measures have been taken to heat a catalytic converter;
- wherein a second dynamic operating state results when the start time is exceeded and the post-start time falls short of the defined value and the catalytic converter is heated, the processing unit of the control unit supplying at least one second differential ignition angle for the second dynamic operating state.

15. The device of claim 14, wherein at least one value of at least one of the first differential ignition angle and the second differential ignition angle is time-dependent, the processing unit of the control unit supplying one of a new first differential ignition angle value and a new second differential ignition angle value after each first time step.

16. The device of claim 15, wherein a size of the first time step is a function of temperature.

17. The device of claim 15, wherein:
- the control unit contains an element for measuring a quantity of secondary air present, the control unit providing a characteristic curve which contains at least one second weighting factor as a function of the quantity of secondary air present, and the control unit recalculating a time step when a second limiting value of the secondary-air quantity is exceeded, wherein a second time step results as a product of the second weighting factor and the first time step.

18. The device of claim 15, wherein at least one value of at least one of the first differential ignition angle and the second differential ignition angle includes a value ranging from 0 to a difference between a maximally retarded start-time ignition angle and the static combustion limit, the maximally retarded start-time ignition angle representing the maximally retarded ignition angle for times smaller than the start time.

19. The device of claim 18, wherein the control unit calculates the at least one value of the at least one of the first differential ignition angle and the second differential ignition angle in terms of a monotonically decreasing function as a function of one of the first time step and the second time step.

20. The device as recited in claim 19, wherein a linear function of one of the first time step and the second time step is present in a memory of the control unit as the monotonically decreasing function.

21. A method for determining an ignition angle of an internal combustion engine with a control unit and a limiting module, comprising:
   optimizing a setpoint ignition angle as a function of operating parameters of the engine;
   limiting the setpoint ignition angle to a maximally retarded ignition angle for an operation of the engine;
   making a differentiation in the control unit between a steady operating state and at least one dynamic operating state, wherein in the steady operating state, the maximally retarded ignition angle assumes a value of a static combustion limit;
   calculating at least one differential ignition angle for each dynamic operating state; and
   shifting, upon occurrence of a respective dynamic operating state, the maximally retarded ignition angle by the at least one differential ignition angle to more advanced ignition angles with respect to the static combustion limit.

22. The method of claim 21, wherein the calculating step further includes storing the at least one differential ignition angle.

23. The method of claim 21, further comprising the step of:
   ascertaining the value of the static combustion limit from at least one of a speed-dependent and a load-dependent program map.

24. The method of claim 23, wherein the maximally retarded ignition angle is an absolute angle.

25. A method for determining an ignition angle of an internal combustion engine with a control unit and a limiting module, comprising:
   optimizing a setpoint ignition angle as a function of operating parameters of the engine;
   limiting the setpoint ignition angle to a maximally retarded ignition angle for an operation of the engine;
   making a differentiation in the control unit between a steady operating state and at least one dynamic operating state wherein in the steady operating state, the maximally retarded ignition angle assumes a value of a static combustion limit;
   calculating at least one differential ignition angle for each dynamic operating state, and
   shifting, upon occurrence of a respective dynamic operating state, the maximally retarded ignition angle by the at least one differential ignition angle to more advanced ignition angles with respect to the static combustion limit;
   wherein a dynamics indicator exhibits a first dynamics value in response to an existing dynamic, and otherwise exhibits a second dynamics value, and wherein a positive-engagement indicator exhibits a second positive-engagement value in response to an existing positive engagement between engine and drive train, and otherwise exhibits a first positive-engagement value, so that a first dynamic operating state results when the dynamics indicator exhibits the first dynamics value and the positive-engagement indicator exhibits the first positive-engagement value, at least one first differential ignition angle being at least one of determined and stored in the control unit for the first dynamic operating state.

26. The method of claim 25, wherein the at least one first differential ignition angle is activated during an occur time.

27. The method of claim 25, wherein the at least one first differential ignition angle is activated after a waiting time has elapsed after detecting the first dynamic operating state.

28. The method of claim 25, wherein immediately after the positive-engagement indicator exhibits the second positive-engagement value, operating state switches back into the steady operating state.

29. The method of claim 25, wherein values of the at least one first differential ignition angle are taken from a temperature-dependent characteristic curve.

30. The method of claim 26, wherein values of the occur time are taken from a temperature-dependent characteristic curve.

31. The method of claim 27, wherein values of the waiting time are taken from a temperature-dependent characteristic curve.

32. The method of claim 26, wherein values of the occur time are set in an application.

33. The method of claim 27, wherein values of the waiting time are set in an application.

34. The method of claim 25, further comprising the step of:
   measuring a quantity of secondary air present;
   wherein a second dynamic operating state results when the dynamics indicator exhibits the first dynamics value and the positive-engagement indicator exhibits the first positive-engagement value and the quantity of secondary air present exceeds a first limiting value, at least one second differential ignition angle being at least one of calculated and stored in the control unit for the second dynamic operating state as a function of the first limiting value.

35. The method of claim 34, wherein values of the at least one second differential ignition angle are calculated for the second dynamic operating state by multiplying at least one value of the first differential ignition angle by a first weighting factor, the first weighting factor being a function of the first limiting value.

36. A method for determining an ignition angle of an internal combustion engine with a control unit and a limiting module, comprising:
   optimizing a setpoint ignition angle as a function of operating parameters of the engine;
   limiting the setpoint ignition angle to a maximally retarded ignition angle for an operation of the engine;
   making a differentiation in the control unit between a steady operating state and at least one dynamic operating state wherein in the steady operating state, the maximally retarded ignition angle assumes a value of a static combustion limit;
   calculating at least one differential ignition angle for each dynamic operating state;

shifting, upon occurrence of a respective dynamic operating state the maximally retarded ignition angle by the at least one differential ignition angle to more advanced ignition angles with respect to the static combustion limit; and performing a time measurement, so that a first dynamic operating state results when a start time is exceeded and a post-start time falls short of a defined value, at least one first differential ignition angle being at least one of stored and calculated for the first dynamic operating state.

37. The method of claim 36, further comprising the step of:

monitoring whether the catalytic converter is being heated;

wherein a second dynamic operating state results when the start time is exceeded and the post-start time falls short of the defined value and measures have been taken to heat the catalytic converter, at least one second differential ignition angle being at least one of stored and calculated for the second dynamic operating state.

38. The method of claim 37, wherein at least one of the first differential ignition angle and the second differential ignition angle is time-dependent, at least one of a new first differential ignition angle value and a new second differential ignition angle value being calculated after each first time step.

39. The method of claim 38, wherein a size of the first time step is a function of temperature.

40. The method of claim 38, further comprising the steps of:

measuring a quantity of secondary air present; and providing a characteristic curve which contains at least one weighting factor as a function of the quantity of secondary-air present, a second time step being calculated by multiplying the first time step by the weighting factor when a limiting value of the quantity of secondary air present is exceeded.

41. The method of claim 38, wherein at least one value of at least one of the first differential ignition angle and the second differential ignition angle includes angles of a value ranging from 0 to a difference between a maximally retarded start-time ignition angle and the static combustion limit, the maximally retarded start-time ignition angle representing a most retarded, maximum ignition angle for times smaller than the start time.

42. The method of claim 41, wherein the at least one value of the at least one of the first differential ignition angle and the second differential ignition angle is calculated in terms of a monotonically decreasing function as a function of at least of one of the first time step and the second time step.

43. The method of claim 42, wherein the monotonically decreasing function represents a linear function of at least one of the first time step and the second time step.

* * * * *